C. P. DEWEY & R. P. SCOTT.
ICE-CREEPER.
No. 192,057. Patented June 19, 1877.
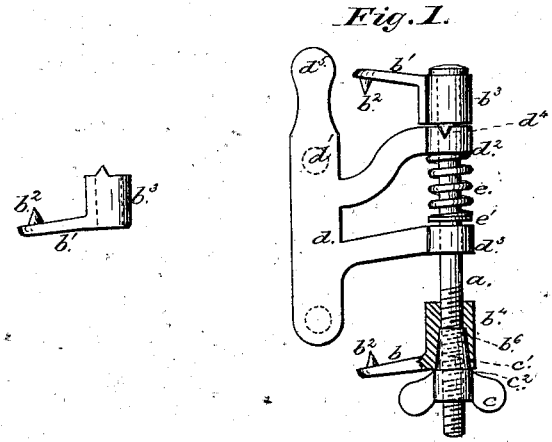
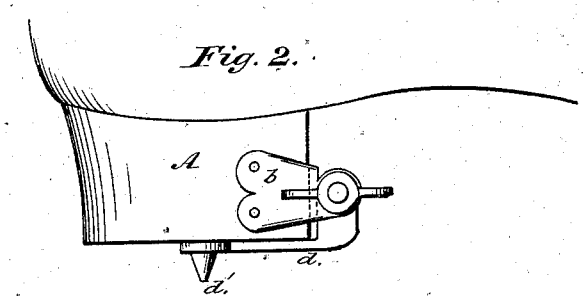
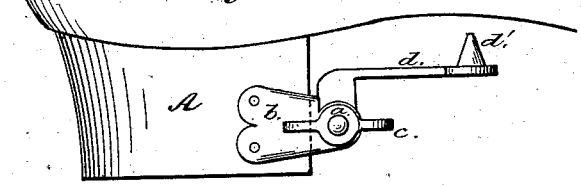
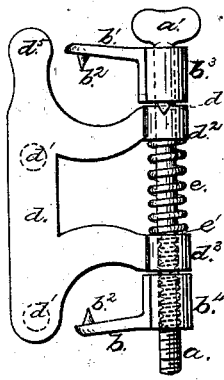
Witnesses:
T. C. Brecht,
R. H. Lacey.
Inventor:
Charles P. Dewey
Robt P. Scott
By R.S. & A.P. Lacey
attorneys

UNITED STATES PATENT OFFICE.

CHARLES P. DEWEY AND ROBERT P. SCOTT, OF CADIZ, OHIO.

IMPROVEMENT IN ICE-CREEPERS.

Specification forming part of Letters Patent No. 192,057, dated June 19, 1877; application filed May 25, 1877.

*To all whom it may concern:*

Be it known that we, CHARLES P. DEWEY and ROBERT P. SCOTT, of Cadiz, in the county of Harrison and State of Ohio, have invented certain new and useful Improvements in Ice-Creepers; and we do hereby declare that the following is a full, clear, and exact description thereof, which will enable others skilled in the art to which it pertains to make and use the same, reference being had to the accompanying drawing, and to the letters of reference marked thereon, which form a part of this specification.

Our invention relates to improvements in ice-creepers; and has for its object to furnish a device which will combine the advantages of a hinged and a detachable creeper, and which, when attached to the heel, may be readily thrown into or out of action, and which is adjustable to heels of any depth or width. It consists in a bolt, a pair of adjustable jaws, a retaining-spring, a swinging or hinged calk-plate, and in other parts, all combined, arranged, and operating as hereinafter fully explained.

In the drawings, Figure 1 is a view of the creeper detached from the heel, and Figs. 2 and 3 show the creeper attached to the heel. Fig. 4 shows a slight modification.

$a$ is the single supporting bolt or rod, to which all the other parts of the device are secured. When attached it lies horizontally on the front side of the heel A, as shown in Figs. 2 and 3. It has a thread formed on one end, while its opposite end may or may not, as preferred, be formed with a head or thumb piece, as shown in Fig. 4.

$b$ $b'$ are the jaws, by which the device is attached to the heel. In constructing the device we prefer to make the jaw $b'$ fast to and the jaw $b$ to slide feely on the bolt $a$. Each jaw is provided with a suitable spur or spurs, $b''$, which prevents it from slipping off the heel, and they are formed with sleeves $b^3$ $b^4$. On the inner or bearing end of the sleeve $b^3$ is formed a projection or cam, $b^5$, adapted to engage in recesses, hereinafter described.

The jaw $b$ is, by preference, constructed with a conical-shaped bore, $b^6$, into which the cone-shaped end $c^1$ of the locking-nut $c$ snugly fits. The nut $c$ has a slight enlargement or collar, $c^2$, which abuts against the outer end of the jaw $b$.

When the nut is turned into the jaw, as shown in Fig. 1, the abutting-collar and the end $c^1$ fitting snugly against and into the jaw makes a tight joint, which prevents water, dirt, or ice from reaching that part of the bolt within the jaw, and, thus preserved, a better action is at all times secured.

$d$ is the calk-plate, to which are secured the spurs or calks $d^1$ $d^1$. It is provided with the lugs $d^2$ $d^3$, which are journaled on the bolt $a$. The lug $d^3$ has formed in its end two opposite recesses, $d^4$ $d^4$, adapted to receive the projection or cam $b^4$, by which the calk-plate is locked in or out of action.

$e$ is a spring, placed on the bolt $a$ between the lugs $d^2$ $d^3$. It bears against and retains the lug $d^2$ at all times firmly against the jaw $b'$, and it is prevented from slipping longitudinally on the bolt by any suitable means placed at $e'$.

At or near the outer end of the plate $d$ is formed or attached a lateral projection, $d^5$, which extends outward far enough that it may be readily caught either by the fingers or by the toe of the opposite boot, and the plate thereby turned into or out of action.

In Fig. 4 is shown a modification of our device, wherein we dispense with the nut $c$. In this construction the jaw $b'$ is loose on the rod $a$, and the jaw $b$ is formed without the conical recess $b^6$, and is threaded, as shown. The bolt $a$ is formed with the winged head $a^1$, and is turned in the operation of clamping the jaws to the boot-heel.

The operation of the device will be readily understood: The jaws are placed on the sides of the heel with the rod or bolt against the front side. By turning the nut $c$ or the bolt $a$ the device will be securely fastened to the boot. The calk-plate may be turned into action, as shown in Fig. 2, or forward against the boot-shank, as shown in Fig. 3, where it will be entirely out of the way.

It will be readily understood that this device can be applied to any size heel. The jaws can be attached near the under face of the heel, and may be set wider or nearer together, as the width may require.

Having described our invention, what we claim, and desire to secure by Letters Patent, is—

1. The combination, with the calk-plate $d$ supported on a rod, $a$, of the adjustable jaws $b\ b'$, for the purpose set forth.

2. The combination, with the bolt $a$ and the sliding jaw $b$, constructed with the recess $b^6$, of the nut $c$, having the elongated end $c^1$, and shoulder $c^2$, for the purpose set forth.

3. The combination, with the calk-plate $d$, having the lugs $d^2\ d^3$, and notches or recesses $d^4$, of the jaw $b'$, constructed with the cam or projection $b^4$, and spring $e$, substantially as and for the purpose specified.

In testimony that we claim the foregoing as our own we affix our signatures in presence of two witnesses.

CHARLES P. DEWEY.
ROBT. P. SCOTT.

Witnesses to signature of C. P. Dewey:
D. A. HOLLINGSWORTH,
D. CUNNINGHAM.

Witnesses to signature of R. P. Scott:
P. B. TURPIN,
WM. J. OSGOOD.